United States Patent
Liu et al.

(10) Patent No.: US 12,220,822 B2
(45) Date of Patent: Feb. 11, 2025

(54) ROBOT MOVEMENT APPARATUS AND RELATED METHODS

(71) Applicant: Intel Corporation, Santa Clara, CA (US)

(72) Inventors: Zhongxuan Liu, Beijing (CN); Zhe Weng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/492,458

(22) Filed: Oct. 23, 2023

(65) Prior Publication Data

US 2024/0123617 A1   Apr. 18, 2024

Related U.S. Application Data

(63) Continuation of application No. 17/271,779, filed as application No. PCT/CN2018/108253 on Sep. 28, 2018, now Pat. No. 11,850,752.

(51) Int. Cl.
*G06F 17/00* (2019.01)
*B25J 9/16* (2006.01)

(52) U.S. Cl.
CPC ............ *B25J 9/1664* (2013.01); *B25J 9/163* (2013.01); *B25J 9/1653* (2013.01); *B25J 9/161* (2013.01)

(58) Field of Classification Search
CPC ........ B25J 9/1664; B25J 9/163; B25J 9/1653; B25J 9/161; G06N 3/044; G06N 3/126; G06N 7/01; G06N 20/10
(Continued)

(56) References Cited

U.S. PATENT DOCUMENTS

| 9,875,440 B1 | 1/2018 | Commons |
| 10,322,507 B2 | 6/2019 | Meier |

(Continued)

FOREIGN PATENT DOCUMENTS

| CN | 103135549 A | 6/2013 |
| CN | 103926839 A | 7/2014 |

(Continued)

OTHER PUBLICATIONS

A comprehensive study over Reinforcement Learning and Q-Learning (Year: 2024).*
Metzen et al., "Bayesian Optimization for Contextual Policy Search," 2015, 2 pages.
Chen et al., "Learning to Learn Without Gradient Descent," Jun. 12, 2017, 9 pages.

(Continued)

*Primary Examiner* — Ronnie M Mancho
(74) *Attorney, Agent, or Firm* — HANLEY, FLIGHT & ZIMMERMAN, LLC

(57) ABSTRACT

Apparatus, systems, articles of manufacture, and methods for robot movement are disclosed. An example robot movement apparatus includes a sequence generator to generate a sequence of context variable vectors and policy variable vectors. The context variable vectors are related to a movement target, and the policy variable vectors are related to a movement trajectory. The example apparatus includes a calculator to calculate an upper policy and a loss function based on the sequence. The upper policy is indicative of a robot movement, and the loss function is indicative of a degree to which a movement target is met. The example apparatus also includes a comparator to determine if the loss function satisfies a threshold and an actuator to cause the robot to perform the robot movement of the upper policy when the loss function satisfies the threshold.

19 Claims, 5 Drawing Sheets

(58) Field of Classification Search
USPC .......................................................... 700/245
See application file for complete search history.

(56) References Cited

U.S. PATENT DOCUMENTS

| | | | |
|---|---|---|---|
| 10,788,836 | B2 | 9/2020 | Ebrahimi Afrouzi |
| 10,860,629 | B1* | 12/2020 | Gangadharaiah ... G06F 16/3329 |
| 11,086,317 | B2* | 8/2021 | Healey ............... G01C 21/3484 |
| 11,340,079 | B1* | 5/2022 | Ebrahimi Afrouzi ..... G06T 7/70 |
| 11,833,681 | B2* | 12/2023 | Iqbal ........................ B25J 9/163 |
| 11,850,752 | B2 | 12/2023 | Liu et al. |
| 2017/0072565 | A1 | 3/2017 | Egerstedt et al. |
| 2018/0025664 | A1 | 1/2018 | Clarke |
| 2018/0099409 | A1 | 4/2018 | Meier |
| 2018/0218262 | A1 | 8/2018 | Okada |
| 2019/0049957 | A1* | 2/2019 | Healey ................. B60W 40/08 |
| 2020/0061811 | A1* | 2/2020 | Iqbal ........................ G06N 3/08 |
| 2021/0205988 | A1 | 7/2021 | James |
| 2021/0308863 | A1 | 10/2021 | Liu |
| 2022/0105624 | A1 | 4/2022 | Kalakrishnan |
| 2022/0143820 | A1* | 5/2022 | Bashkirov .............. B25J 9/1641 |

FOREIGN PATENT DOCUMENTS

| | | |
|---|---|---|
| CN | 106951512 A | 7/2017 |
| CN | 108376284 A | 8/2018 |
| GB | 2577312 A | 3/2020 |

OTHER PUBLICATIONS

Abdolmaleki et al., "Contextual Covariance Matrix Adaptation Evolutionary Strategies," Proceedings of the Twenty-Sixth International Joint Conference on Artificial Intelligence (IJCAI-17), Aug. 2017, 8 pages.

Chatzilygeroudis et al., "A Survey on Policy Search Algorithms for Learning Robot Controllers in a Handful of Trials," Aug. 6, 2018, 19 pages.

International Searching Authority, "Written Opinion," issued in connection with International Patent Application No. PCT/CN2018/108253, mailed on Jun. 27, 2019, 3 pages.

International Searching Authority, "International Search Report," issued in connection with International Patent Application No. PCT/CN2018/108253, mailed on Jun. 27, 2019, 3 pages.

Tekülve et al., "Autonomous Sequence Generation for a Neural Dynamic Robot: Scene Perception, Serial Order, and Object-Oriented Movement," Frontiers in Neurobotics, vol. 13, Nov. 2019, 18 pages.

International Searching Authority, "International Preliminary Report on Patentability," issued in connection with International Patent Application No. PCT/CN2018/108253, mailed on Apr. 8, 2021, 5 pages.

United States Patent and Trademark Office, "Notice of Allowance and Fee(s) Due," issued in connection with U.S. Appl. No. 17/271,779, dated Aug. 21, 2023, 8 pages.

\* cited by examiner

ROBOT MOVEMENT APPARATUS AND RELATED METHODS

RELATED APPLICATIONS

This patent arises from a continuation of U.S. patent application Ser. No. 17/271,779, which was filed on Feb. 26, 2021, which is the U.S. national stage of International Patent Application Serial No. PCT/CN2018/108253, which was filed on Sep. 28, 2018. Priority is claimed to U.S. patent application Ser. No. 17/271,779 and International Patent Application Serial No. PCT/CN2018/108253. U.S. patent application Ser. No. 17/271,779 and International Patent Application Serial No. PCT/CN2018/108253 are hereby incorporated by reference in their entireties for all purposes.

FIELD OF THE DISCLOSURE

This disclosure relates generally to robots, and, more particularly, to robot movement apparatus and related methods.

BACKGROUND

Robots may be programmed to effect certain movements. In addition, artificial neural networks are used to enable robot movement without robots being programmed for the robot movement.

BRIEF DESCRIPTION OF THE DRAWINGS

The figures are not to scale. Also, in general, the same reference numbers will be used throughout the drawing(s) and accompanying written description to refer to the same or like parts.

DETAILED DESCRIPTION

Figure 1:
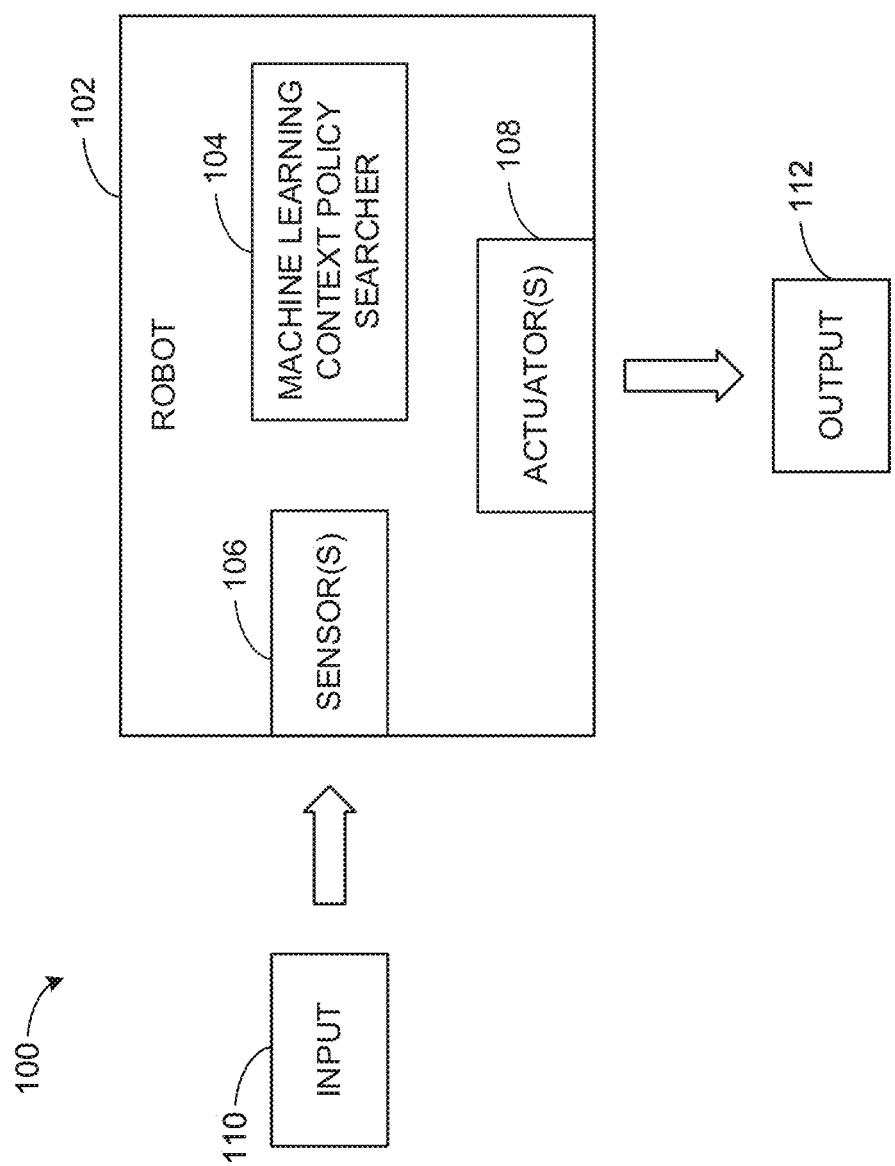
FIG. 1 is a block diagram of an example system to effect robot movement including an example machine learning context policy searcher in accordance with the teachings of this disclosure.

Robot movement including robot navigation is important for the utilization of robots to effect specific tasks. Adaptability of robot movement is useful in environments in which the robot encounters changing weather, diverse terrain, and/or unexpected or changing situations including, for example, collision detection and avoidance and/or the loss of functionality (e.g., a robot loses full range of motion of a leg and needs to continue to ambulate). Also, in some examples, adapting robot movement is beneficial where the robot is to learn a new skill, action, or task.

Adaptability of robot movement can be accomplished through machine learning. Machine learning gives computer systems the ability to progressively improve performance without being explicitly programmed. An example machine learning methodology is meta learning in which automatic learning algorithms are applied on metadata. Another example machine learning methodology is deep learning, which uses deep neural networks or recurrent neural networks to enhance performance of the computer system based on data representations and not task-specific algorithms.

A further example is reinforcement learning, which is concerned with how a robot or other computer system agent ought to take actions in an environment so as to maximize some notion of long-term reward. Reinforcement learning algorithms attempt to find a policy that maps states of the world to the actions the robot ought to take in those states. Thus, a policy provides parameters of actions to be effected or performed by a robot based on environmental conditions and/or conditions or characteristics of the robot. With reinforcement learning, the robot interacts with its environment and receives feedback in the form of rewards. The robot's utility is defined by the reward function, and the robot learns to act so as to maximize expected rewards. The machine or reinforcement learning is based on observed samples of outcomes. Reinforcement learning differs from a supervised learning in that correct input/output pairs are not presented, nor are sub-optimal actions explicitly corrected.

Reinforcement learning may include a step-based policy search or an episode-based policy search. Step-based policy searching uses an exploratory action in each time step of the learning process. Episode-based policy searching changes a parameter vector of the policy at the start of an episode in the learning process.

As a solution for robot reinforcement learning, episode-based policy searching improves skill parameters of robot by tries. One of the core challenges of such method is to generate contextual policy with high sample efficiency. Bayesian optimization is a sample efficient method for contextual policy search, but Bayesian optimization has the disadvantage of a computing burden that is cubic to number of samples. Another example methodology is contextual covariance matrix adaptation evolutionary strategies, which uses covariance matrix adaptation evolutionary strategies to find optimal parameters. Contextual covariance matrix adaptation evolutionary strategies have much less sample efficiency than Bayesian optimization contextual policy search.

The examples disclosed herein ensure sample efficiency for contextual policy search that has linear time cost to the number of samples. The example disclosed herein also have both sample efficiency and computing efficiency. These efficiencies are important where robot activity simulation episodes can cost about 0.1 seconds to about 1 second per episode, and a learning process may include numerous attempts (e.g., hundreds to millions).

The examples disclosed herein include a training process and an inference process. The example training process involves a cost function that makes the process of sampling accomplish, simultaneously, both a high value of samples and weighted regression of the samples. The samples are weighted regressed to generate an upper policy, which is represented by a parameterized function. As disclosed herein, the distance of the upper policy to an ideal upper policy is used as part of the cost consideration in the machine learning process.

In the example inference process, a trained long short-term memory (LSTM) model is used to sample in the contextual policy search process. The inference process also uses the samples to generate the upper policy by weighted regression. LSTMs are a type of recurrent neural network (RNN). RNNs are networks with loops in the network, allowing information to persist so that, for example, previous information can be used by a robot for a present task. The loops are in the form of a chain of repeating modules of neural network. In some RNNs, the repeating module will have a simple structure, such as, for example, a single tanh layer. LSTMs also have the chain-like structure, but the repeating module have a more complex structure. Instead of having a single neural network layer, LSTMs including a plurality (e.g., four) of interacting neural network layers.

FIG. 1 is a block diagram of an example system 100 to effect robot movement. The example system 100 includes an example robot 102 that includes an example machine learning context policy searcher 104, example sensor(s) 106, and example actuator(s) 108.

The sensor(s) 106 of the robot 102 receive an input 110. The input 110 can be information about the environment including, for example, weather information, terrain information, information about other robots, and/or other information that may be used to assess the state of the robot's surroundings. In addition, the input 110 may be information obtained about internal functioning of the robot 102 or other information concerning the robot 102 including, for example, information about the physical and/or processing functions and/or capabilities of any of the robot's systems.

The input 110 is used by the machine learning context policy searcher 104 to determine a policy based on a context such as a desired output. The policy identifies an action to be taken by the robot 102 based on the input 110 and the context. The actuator(s) 108 of the robot 102 are used to deliver an output 112 in accordance with the action identified by the policy.

Consider, for example, the robot 102 holding a ball and controlling the robot 102 to throw the ball to objective position. Here the objective position is the context. A different trajectory would be generated to control a robot arm or other actuator 108 according to the different objective positions or different contexts. The parameter to generate the trajectory is known as a policy parameter or policy. The policy, in this example, is generated automatically by the machine learning context policy searcher 104.

To facilitate adding the new skill for the robot 102, a reward function related to the context is defined by the machine learning contact policy searcher 104 to judge if the robot 102 does the activity well. The robot 102 performs multiple attempts to improve the context policy search in simulation, in reality, and/or jointly in simulation and reality. During this process an upper policy is learned, which is a projection from contexts to robot joint trajectory parameters. This learning process is done by an optimization process to improve the reward function.

Figure 2:
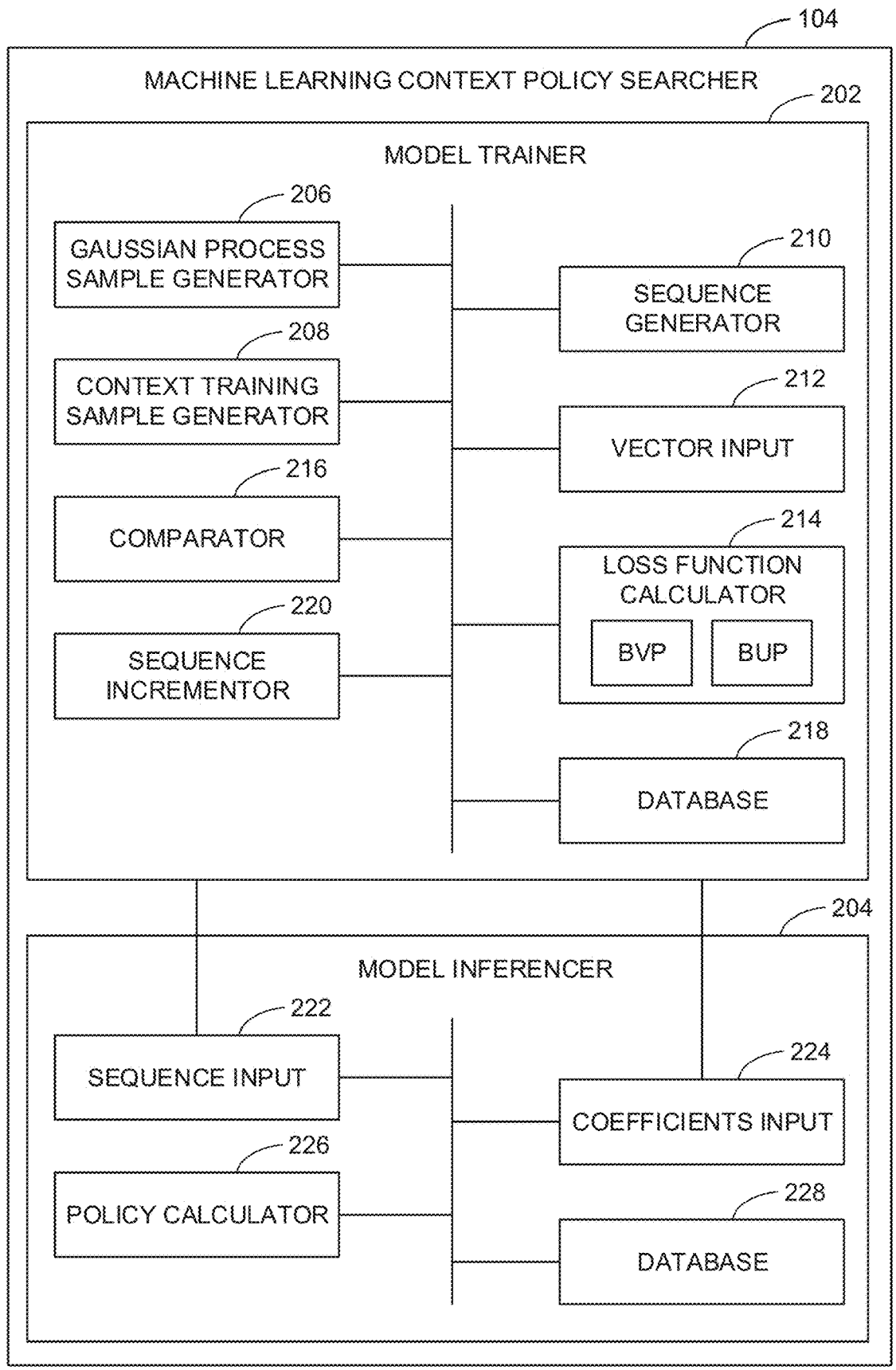
FIG. 2 is a block diagram of the example machine learning context policy searcher of FIG. 1

FIG. 2 is a block diagram of the example machine learning context policy searcher 104 of FIG. 1. The example machine learning context policy searcher 104 includes an example model trainer 202 and an example model inferencer 204. The example model trainer 202 includes an example Gaussian process sample generator 206, an example context training sample generator 208, an example sequence generator 210, an example vector input 212, an example calculator such as an example loss function calculator 214, an example comparator 216, an example database 218, and an example sequence incrementor 220. The example model inferencer 204 includes an example sequence input 222, an example coefficients input 224, and example policy calculator 226, and an example database 228.

The example machine learning context policy searcher 104 and its components form part of an apparatus to move the robot 102 based on context policy. The machine learning context policy searcher 104 operates in two parts: a training part executed with the model trainer 202 and an inference part executed with the model inferencer 204. In this example, in the training part, an LSTM model is trained. In other examples, there may be other RNNs than an LSTM including, for example, a differentiable neural computer (DNC). Also in this example, in the inference part, the LSTM is used to sample the new contextual policy search task and an upper policy is generated according to a sample sequence. Using the upper policy, the robot 102 can have ability to get fitful policy according to any context of the task.

In an example training process, the Gaussian process sample generator 206 generates Gaussian process samples. For example, the Gaussian process sample generator 206 generates Gaussian process samples:

$$GP_{i=1 \ldots I}(x)$$

The dimension of:

$$GP_i(x)(d_x)$$

is the same with the dimension of x (policy parameter vector), I is the number of training samples.

The Gaussian process is a description of unknown random process that only assumes the random distribution of each time point is a Gaussian distribution and the covariance between each two time point distributions is only related to the time difference of the two time points. Gaussian distribution describes the unknown point distribution according to Central Limit theorem.

The context training sample generator 208 generates context training samples. For example, the context training sample generator 208 generates context training samples:

$$CS_{i=1 \ldots I}(s,x)$$

The dimension of:

$$CS_{i=1 \ldots I}(s,x)(d_{cs}) \text{ is: } d_{cs}=d_x+d_s$$

here $d_s$ is the dimension of context vector s.

$$CS_{i=1 \ldots I}(s,x)$$

is translational version of:

$$GP_{i=1 \ldots I}(x)$$

and the translation is decided by a randomly generated polynomial function.

The sequence generator 210 generates a sequence of context variable vectors and policy variable vectors. For example, the sequence generator 210 generates the sequence of:

$$s_t \text{ and } x_t$$

For example, when the LSTM parameters θ are given, a sampling process can generate the sequence of $s_t$ and $x_t$. The context variable vectors are related to a movement goal or target, and the policy variable vectors are related to a movement trajectory. The sequence is based on the Gaussian process samples and the context training samples. For example, N1 Gaussian process samples may be generated, and N2 context samples are generated for each of the Gaussian process sample. Each context sample is a polynomial function. In this example, the generated sequence is for a subset of these N1*N2 samples. The objective of the system and method optimization is to ensure the sampling process converges for all or most of the N1*N2 samples. In addition, in some examples, the Gaussian process samples and the context samples are generated online, which may also increase a score of the model in the RNN for the online samples.

The example vector input 212 inputs into the loss function calculator and into each cell of the RNN a plurality of inputs. In some examples, the inputs include a latent variable vector $h_t$. Also, in some examples, the input includes an input-context variable vector:

$$s_t=[s_{t,1}s_{t,2} \ldots s_{t,d_s}]$$

and policy variable vector $x_t$. Also, in some examples, the input includes a reward value $y_t$.

The example model trainer 202 also includes the example loss function calculator 214, which is to calculate an upper policy and a loss function based on the sequence. The upper policy is indicative of a robot movement, and the loss function is indicative of a degree to which a movement goal or target is met. In some examples, the loss function calculator 214 calculates a loss function:

$$L_{cps}(\theta)=E_{f,y_{1:T-1}}[F(s_{1:T},x_{1:T})+\alpha D(A,\hat{A})]$$

The loss function is composed of two parts: a first part that encourages sampling better value points:

$$F(s_{1:T},x_{1:T})$$

(called BVP); and a second part that encourages sampling to generate better upper policy:

$$D(A,\hat{A})$$

(called BUP).

The loss function calculator calculates the BVP as:

$$F(s_{1:T}, x_{1:T}) = \sum_{t=1}^{T} f(s_t, x_t)$$

where $f(s_t, x_t)$ is the value of the tth point in the sequence. Other methods to define BVP may be used in other examples.

The loss function calculator calculates the BUP is as:

$$D(A,\hat{A})=\|\hat{A}-A\|_2$$

where A (matrix of size $d_{100}*d_x$) is upper policy computed by training data according to the sampled point sequence, and A is the polynomial to generate the training samples. For example:

$$\hat{A} = \begin{bmatrix} 1 & 2 \\ 2 & 0 \\ 0 & 3 \end{bmatrix} \text{ for } \begin{cases} x_1 = 1 + 2s_1 \\ x_2 = 2 + 3s_2 \end{cases}$$

Here:

$$A = \underset{A}{\mathrm{argmin}}\|D^{1/2}(\Phi A - X)\|_2$$

and then A can be computed as:

$$A=(\Phi^T D\Phi+\lambda I)^{-1}\Phi^T DX$$

Here D is diagonal weighting matrix containing the weightings $d_k$ which can be computed as:

$$d_k=\ln(T+0.5)-\ln(k)$$

where k is the order of descending sorted $f(s_t, x_t)$; $\Phi$ is defined as:

$$\Phi^T=[\varphi_1, \ldots, \varphi_N]$$

(N is length of sampling sequence) and $\varphi_n$ can be selected as:

$$\varphi_n(s_n)=[1 s_n]^T$$

(length of $\varphi_n(s_n)$ is defined as $d_\varphi$); $\lambda I$ is a regularization term. As noted above, in some examples, the calculator is to calculate the upper policy using a diagonal weighting of the sequence.

In some examples, the $\varphi(s)$ can be arbitrary $n_\varphi$-dimensional feature function of the context s. Also, in some examples, the $\varphi(s)$ is selected as linear generalization over contexts, while other examples may have other generalizations. In addition, in some examples, the BUP, $D(A,\hat{A})$, can also be other forms of matrix distance. Also, in some examples, the loss function, $L_{cps}(\theta)$, can also be other forms of function with $F(s_{1:T}, x_{1:T})$ and $D(A,\hat{A})$ as input.

In some examples, the LSTM network can be trained to diminish the loss function from the data. For example, the model trainer 202 includes the comparator 216 to determine if the loss function satisfies a threshold. If the loss function does not meet the threshold, the sequence incrementor 220 will increment the value for t and the model trainer 202 runs through the simulation again with a renewed sequence generation, BVP, BUP, and loss function calculation, etc. For example, for a new task, the RNN generates s_t and x_t, the environment returns y_t, and then RNN generates s_(t+1) and x_(t+1). The process will go on.

If the comparator 216 determines that the loss function does meet the threshold, the machine learning context policy searcher 104 considers the model trained and the coefficients of the RNN are set as those computed during the training phase with operation of the model trainer 202. In some examples, the coefficients are known as the model. The model trainer 202 can store the coefficients, the model, the samples, and/or other data related to the training process in the database 218 for access in subsequent operations. With the model trained, the machine learning context policy searcher 104 triggers operation of the model inferencer 204.

In the inference stage, the model inferencer 204 inputs or accesses the sequence generated for a new task via the sequence input 222. For example, a sequence of samples:

$$(s_{1:T}, x_{1:T})$$

The model inferencer 204 also inputs or access the coefficients (the trained model) via the coefficients input 224.

The model inferencer 204 further includes the policy calculator 226 that calculates the upper policy. For example, the policy calculator 226 determined the upper policy by:

$$A=(\Phi^T D\Phi+\lambda I)^{-1}\Phi^T DX$$

The policy calculator 226 can further determine, for any context s, the corresponding policy as:

$$\varphi(s)^T A$$

With the policy determined after the model is trained after the loss function satisfies the threshold, as detailed above, the machine learning context policy searcher 104 can signal to the actuator 108 to cause the robot 102 to perform the robot movement of the upper policy. The calculated upper policy, policy, and/or other data related to the inference process can be stored by the model inferencer 204 for access for subsequent operations. In these examples, the robot movement effected by the actuator(s) 108 in accordance with the policy is first performed by the robot 102 after the sequence generator 210 generates the sequence, and the machine learning context policy searcher 104 operated in accordance with the foregoing teachings.

The selected context used by the context training sample generator 208 has the same range with the actual action to be taken by the robot 102 in the real world. Because any upper policy can be approximated by a polynomial function, training for the random generated upper policy (context samples) can ensure the trained result, which is the movement taken by the robot 102, approximates the optimal upper policy.

While an example manner of implementing the machine learning context policy searcher 104 of FIG. 1 is illustrated in FIG. 2, one or more of the elements, processes and/or devices illustrated in FIG. 2 may be combined, divided, re-arranged, omitted, eliminated, and/or implemented in any other way. Further, the example model trainer 202, the example model inferencer 204, the example Gaussian process sample generator 206, the example context training sample generator 208, the example sequence generator 210, the example vector input 212, the example comparator 216, the example loss function calculator 214, the example database 218, the example sequence incrementor 220, the example sequence input 222, the example coefficients input 2254, the example policy calculator 226, the example database 228, and/or, more generally, the example machine learning context policy searcher 104 of FIG. 2 may be implemented by hardware, software, firmware and/or any combination of hardware, software, and/or firmware. Thus, for example, any of the example model trainer 202, the example model inferencer 204, the example Gaussian process sample generator 206, the example context training sample generator 208, the example sequence generator 210, the example vector input 212, the example comparator 216, the example loss function calculator 214, the example database 218, the example sequence incrementor 220, the example sequence input 222, the example coefficients input 2254, the example policy calculator 226, the example database 228, and/or, more generally, the example machine learning context policy searcher 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example model trainer 202, the example model inferencer 204, the example Gaussian process sample generator 206, the example context training sample generator 208, the example sequence generator 210, the example vector input 212, the example comparator 216, the example loss function calculator 214, the example database 218, the example sequence incrementor 220, the example sequence input 222, the example coefficients input 2254, the example policy calculator 226, the example database 228, and/or the example machine learning context policy searcher 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine learning context policy searcher 104 of FIGS. 1 and 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
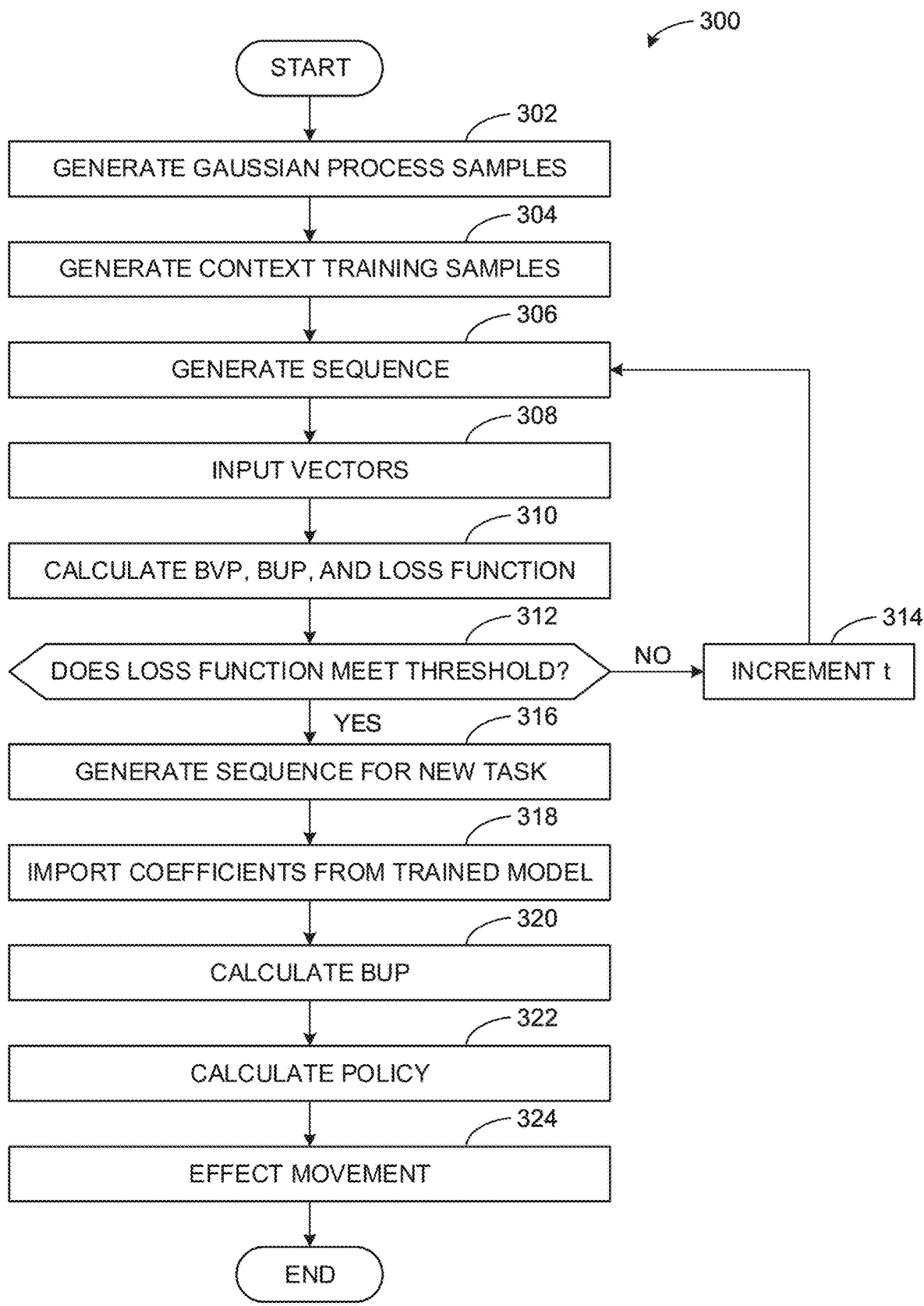
FIG. 3 is a flowchart representative of machine or computer readable instructions that may be executed to implement the example system of FIG. 1 and example machine learning context policy researcher of FIGS. 1 and 2.

A flowchart representative of example hardware logic, machine or computer readable instructions, hardware implemented state machines, and/or any combination thereof for implementing the example machine learning context policy searcher 104 of FIG. 2 is shown in FIG. 3. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 3, many other methods of implementing the example machine learning context policy searcher 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects, and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

The program 300 of FIG. 3 is used to train the model such as, for example, the LSTM model. The program 300 includes the Gaussian process sample generator 206 of the model trainer 202 of the machine learning context policy searcher 104 of the robot 102 generating policy variable vectors such as, for example, Gaussian process samples (block 302). The example program 300 also includes the context training sample generator 208 generating context training samples (block 304).

The sequence generator 210 generates a sequence (block 306) based on the Gaussian process samples and the context training samples. The vector input 212 inputs vectors (block 308) into each cell of the RNN of the LSTM model for the sequence. In some examples, the vectors include a latent variable vector, an input-context vector and policy vector, and a reward value.

A calculator, such as the loss function calculator 214, calculates better value points (BVP), better upper policy (BUP), and a loss function (block 310) based on the sequence and input vectors. The comparator 216 determines if the loss function meets or satisfies a threshold (block 312). If the loss function does not meet the threshold, the sequence incrementor 220 increments t, a count in the sequence (block 314). With t incremented, the example program 300 continues with the sequence generator 210 generating the sequence at the incremented t (block 306). The example program 300 continues to determine a new loss function, etc.

If the comparator 216 determines that the loss function does meet the threshold (block 312), the example program 300 has a trained model. For example, the loss function meeting the threshold may be indicative of the LSTM model or network meeting a desired diminished loss function. In this example, with an acceptably diminished loss function, the robot 102 has learned to meet the context or otherwise take the desired action.

The example program 300 continues with the sequence generator 210 generating a sequence for a new task (block 316), which is accessed or received by the model inferencer 204 via the sequence input 222. The coefficients input 224 of the model inferencer 204 imports coefficients from the trained model (block 318). The policy calculator 226 calculates the BUP (block 320). In addition, the policy calculator 226 determines the policy based on the BUP (block 322). With the policy determined, the actuator(s) 108 of the robot 102 perform or effect the movement indicated by the policy (block 324).

Figure 4:
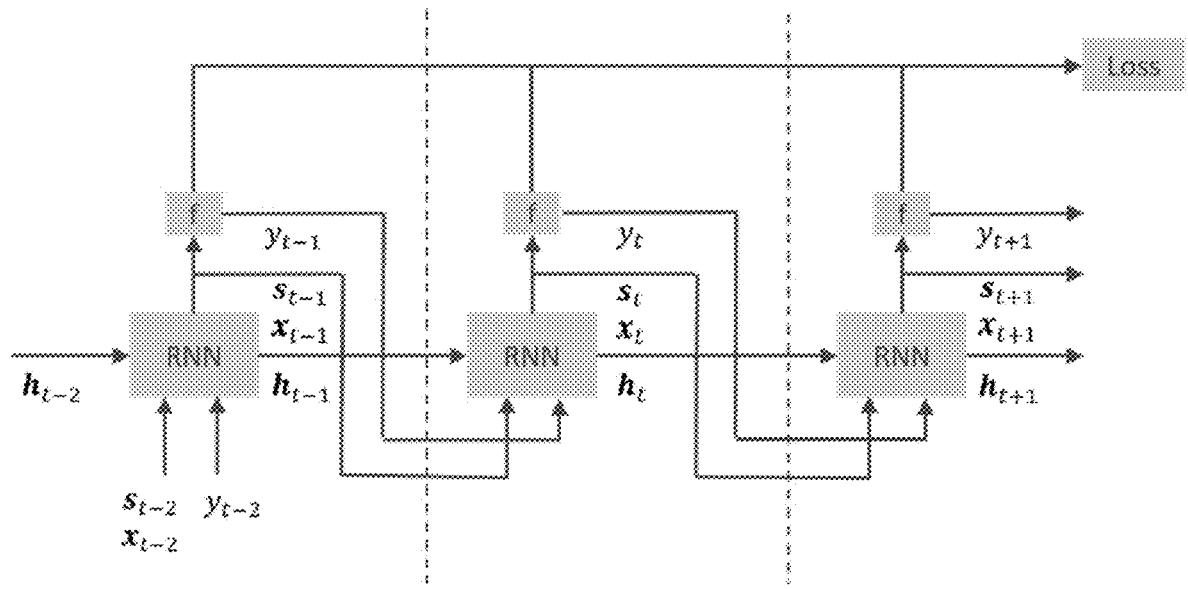
FIG. 4 is a schematic illustration of an example operation of the example model trainer of FIG. 2.
Figure 5:
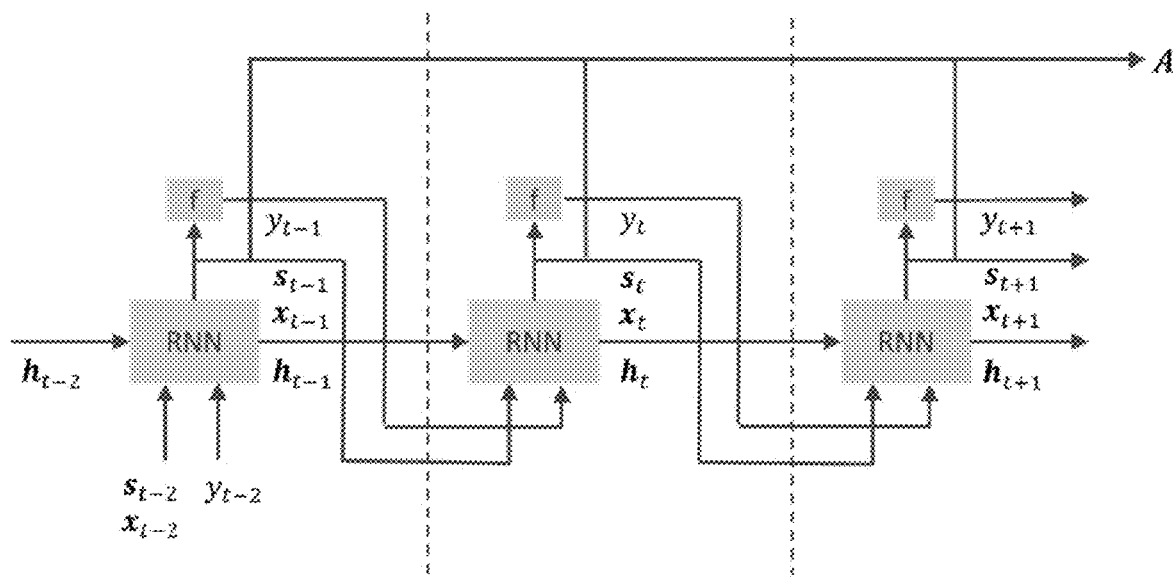
FIG. 5 is a schematic illustration of an example operation of the example model inferencer of FIG. 2.

FIG. 4 is a schematic illustration of an example operation of the example model trainer 202 of FIG. 2, and FIG. 5 is a schematic illustration of an example operation of the example model inferencer 204 of FIG. 2. FIGS. 4 and 5 show the sequence ($s_t$ and $x_t$) of the Gaussian process samples and context training samples for a plurality of RNN cells. In addition, the inputs of the cells is composed of three parts:

(1) latent variable vector:

$h_t$;

(2) input-context variable vector and policy variable vector:

$s_t = [s_{t,1} s_{t,2} \ldots s_{t,d_s}]$; and $x_t$;

(3) reward value:

$y_t$

The training stage of FIG. 4 determines the loss function (labeled "Loss" in the figure). The Loss in FIG. 4 is representative of the reward function. The reward function in the training process is composed of two parts: (1) the better values (y_t) (BVP); and (2) the regressed upper policy (BUP). Both BVP and BUP are to be calculated and optimized. The input used to determine the Loss in FIG. 4 is the output of f(x). The coefficients of the RNN in FIG. 4, the training stage, are calculated and recalculated for optimization.

The inference stage of FIG. 5 uses the loss determined in the training stage as input in RNN cells to determine the upper policy (labeled "A" in the figure). The input used to determine A in FIG. 5 is the s_t and h_t. In the inferencer stage of FIG. 5, the coefficients of the RNN are fixed.

Figure 6:
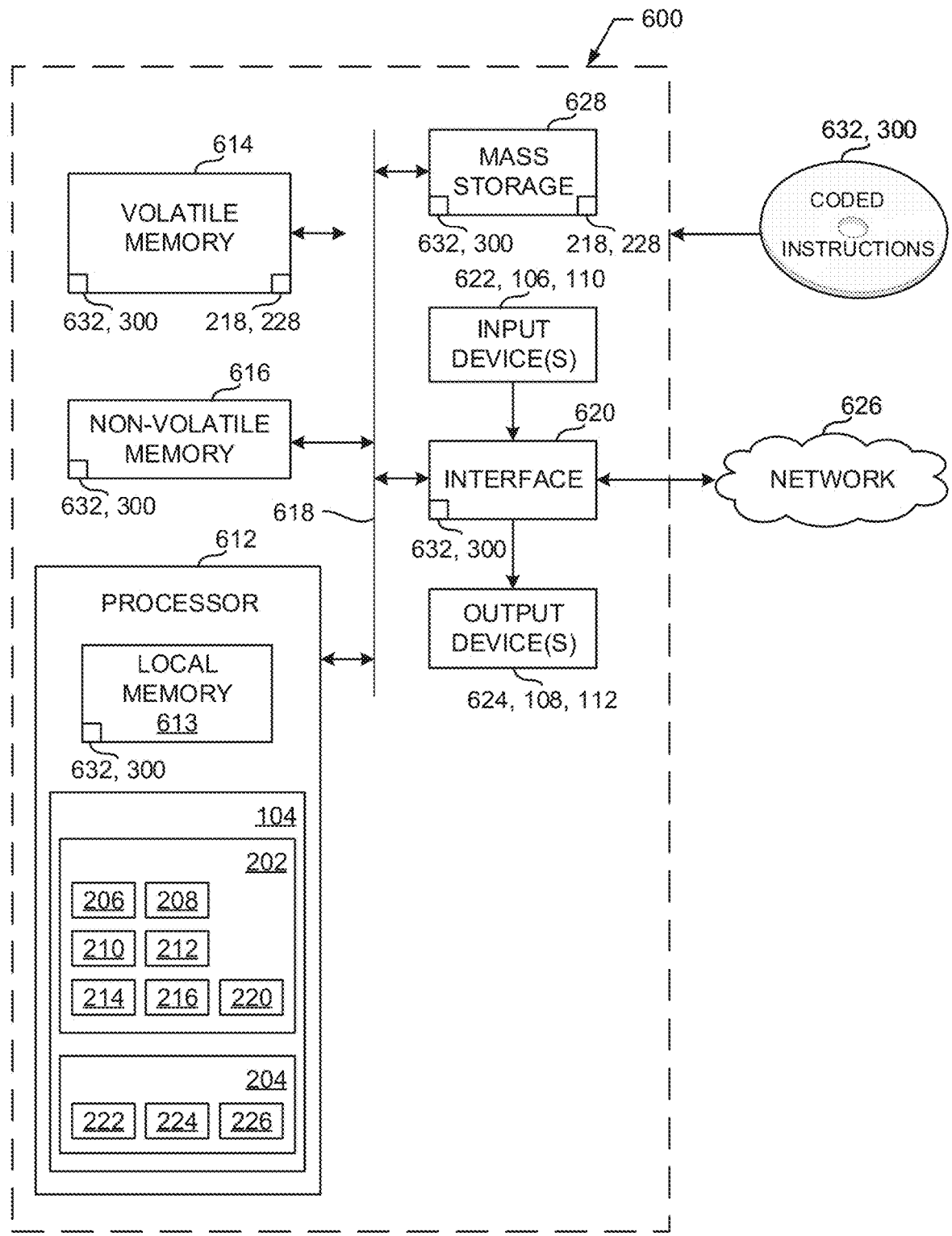
FIG. 6 block diagram of an example processing platform structured to execute the instructions of FIG. 3 to implement the example system of FIG. 1 and example machine learning context policy researcher of FIGS. 1 and 2.

FIG. 6 is a block diagram of an example processor platform 1000 structured to execute the instructions of FIG. 4 to implement the machine learning context policy searcher 104 of FIGS. 1 and 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example model trainer 202, the example model inferencer 204, the example Gaussian process sample generator 206, the example context training sample generator 208, the example sequence generator 210, the example vector input 212, the example comparator 216, the example loss function calculator 214, the example sequence incrementor 220, the example sequence input 222, the example coefficients input 2254, the example policy calculator 226, and/or the example machine learning context policy searcher 104.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622, 106, 110 are connected to the interface circuit 620. The input device(s) 622, 106, 110 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 624, 108, 112 are also connected to the interface circuit 620 of the illustrated example. The output devices 624, 108, 112 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 620 of the illustrated example, thus, typically includes a graphics driver card, a graphics driver chip, and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 300 of FIG. 3 and other machine executable instructions 632 may be stored in the mass storage device 628, in the volatile memory 614, in the non-volatile memory 616, and/or on a removable non-transitory computer readable storage medium such as a CD or DVD.

From the foregoing, it will be appreciated that example apparatus, systems, articles of manufacture, and methods have been disclosed that effect robot movement and, in particular, movement learned by the robot outside of the robot's standard or original programming. These examples use inputs, such as data gathered or otherwise delivered to sensors, which is used in a machine learning context, to output a policy to be used by the robot to change the robot's activity including the movement of the robot. The disclosed apparatus, systems, articles of manufacture, and methods improve the efficiency of using a computing device by enabling a robot to learn new tasks and actions, which allows the robot to adapt to changing surroundings or changing functional capabilities. The disclosed apparatus, systems, articles of manufacture, and methods are accordingly directed to one or more improvement(s) in the functioning of a computer.

Because the context policy is a continuous function and both context and policy parameters are multi-dimensional, the machine learning context policy searcher disclosed herein may execute the learning process many times (e.g., hundreds to millions). Even in a simulation setting, the computing cost (e.g., about 0.1 seconds to about 1.0 second per attempt or per simulation) of such a large number of executions is significant. The examples disclosed herein have linear computing complexity to enable the learning of context policy with high sample efficiency and efficient computing costs. In addition, the examples of this disclosure provide reasonable time and sample efficiency for robot simulation that has better performance than the comparatively lower computing ability against the cloud computing. Therefore, these examples, which enable robots to adapt to new tasks efficiently, are useful to edge computing.

Example apparatus, systems, articles of manufacture, and methods for robot movement are disclosed herein. Example 1 includes a robot movement apparatus to move a robot, where the apparatus includes a sequence generator to generate a sequence of context variable vectors and policy variable vectors, the context variable vectors related to a movement target and the policy variable vectors related to a movement trajectory. The apparatus also includes a calculator to calculate an upper policy and a loss function based on the sequence, the upper policy indicative of a robot movement and the loss function indicative of a degree to which a movement target is met. In addition, the apparatus includes a comparator to determine if the loss function satisfies a threshold and an actuator to cause the robot to perform the robot movement of the upper policy when the loss function satisfies the threshold.

Example 2 includes the robot movement apparatus of Example 1, wherein the calculator is to calculate the upper policy using a diagonal weighting of the sequence.

Example 3 includes the robot movement apparatus of Examples 1 or 2, wherein the calculator is to calculate the loss function further based on the upper policy.

Example 4 includes the robot movement apparatus of Examples 1-3, wherein the sequence is a first sequence, the upper policy is a first upper policy, the robot movement is a first robot movement, and the loss function is a first loss function, the apparatus further including a sequence incrementor to change the first sequence to a second sequence when the first loss function does not satisfy the threshold.

Example 5 includes the robot movement apparatus of Example 4, wherein the calculator is to calculate a second upper policy and a second loss function based on the second sequence, the second upper policy indicative of a second robot movement and the second loss function indicative of the degree to which the movement target is met. The comparator is to determine if the second loss function satisfies the threshold, and the actuator to cause the robot to perform the second robot movement of the second upper policy when the second loss function satisfies the threshold.

Example 6 includes the robot movement apparatus of Examples 1-5, wherein the sequence is based on long short-term memory parameters.

Example 7 includes the robot movement apparatus of Examples 1-6, wherein the calculator is to determine the upper policy further based on a matrix distance.

Example 8 includes the robot movement apparatus of Examples 1-7, wherein the robot movement is first performed by the robot after the sequence generator generates the sequence.

Example 9 is a robot movement apparatus to move a robot, where the apparatus includes means for generating a sequence of context variable vectors and policy variable vectors, the context variable vectors related to a movement target and the policy variable vectors related to a movement trajectory. Example 9 also includes means for calculating an upper policy and a loss function based on the sequence, the upper policy indicative of a robot movement and the loss function indicative of a degree to which a movement target is met. In addition, Example 9 includes means for determining if the loss function satisfies a threshold and means for actuating the robot to perform the robot movement of the upper policy when the loss function satisfies the threshold.

Example 10 includes the robot movement apparatus of Example 9, wherein the means for calculating is to calculate the upper policy using a diagonal weighting of the sequence.

Example 11 includes the robot movement apparatus of Examples 9 or 10, wherein the means for calculating is to calculate the loss function further based on the upper policy.

Example 12 includes the robot movement apparatus of Examples 9-11, wherein the sequence is a first sequence, the upper policy is a first upper policy, the robot movement is a first robot movement, and the loss function is a first loss function, the apparatus further including means for changing the first sequence to a second sequence when the first loss function does not satisfy the threshold.

Example 13 includes the robot movement apparatus of Example 12, wherein the means for calculating is to calculate a second upper policy and a second loss function based on the second sequence, the second upper policy indicative of a second robot movement and the second loss function indicative of the degree to which the movement target is met. The means for determining is to determine if the second loss function satisfies the threshold, and the means for actuating is to actuate the robot to perform the second robot movement of the second upper policy when the second loss function satisfies the threshold.

Example 14 includes the robot movement apparatus of Examples 9-13, wherein the sequence is based on long short-term memory parameters.

Example 15 includes the robot movement apparatus of Examples 9-14, wherein the means for calculating is to determine the upper policy further based on a matrix distance.

Example 16 includes the robot movement apparatus of Examples 9-15, wherein the robot movement is first performed by the robot after the means for generating generates the sequence.

Example 17 is a non-transitory computer readable storage medium including machine readable instructions that, when executed, cause a machine to, at least: generate a sequence of context variable vectors and policy variable vectors, the context variable vectors related to a movement target and the policy variable vectors related to a movement trajectory. The instructions further cause the machine to calculate an upper policy and a loss function based on the sequence, the upper policy indicative of a robot movement and the loss function indicative of a degree to which a movement target is met. In addition, the instructions cause the machine to determine if the loss function satisfies a threshold and actuate a robot to perform the robot movement of the upper policy when the loss function satisfies the threshold.

Example 18 includes the storage medium of Example 17, wherein the instructions cause the machine to calculate the upper policy using a diagonal weighting of the sequence.

Example 19 includes the storage medium of Examples 17 or 18, wherein instructions cause the machine to calculate the loss function further based on the upper policy.

Example 20 includes the storage medium of Examples 17-19, wherein the sequence is a first sequence, the upper policy is a first upper policy, the robot movement is a first robot movement, and the loss function is a first loss function, the instructions further causing the machine to change the first sequence to a second sequence when the first loss function does not satisfy the threshold.

Example 21 includes the storage medium of Example 20, wherein the instructions further cause the machine to calculate is to calculate a second upper policy and a second loss function based on the second sequence, the second upper policy indicative of a second robot movement and the second loss function indicative of the degree to which the movement target is met. Also, the instructions cause the machine to determine is to determine if the second loss function satisfies the threshold and actuate the robot to perform the second robot movement of the second upper policy when the second loss function satisfies the threshold.

Example 22 includes the storage medium of Examples 17-21, wherein the sequence is based on long short-term memory parameters.

Example 23 includes the storage medium of Examples 17-22, wherein the instructions further cause the machine to determine the upper policy further based on a matrix distance.

Example 24 includes the storage medium of Examples 17-23, wherein the robot movement is first performed by the robot after the instructions cause the machine to generate the sequence.

Example 25 is a method to move a robot, the method including generating a sequence of context variable vectors and policy variable vectors, the context variable vectors related to a movement target and the policy variable vectors related to a movement trajectory. The method also includes calculating an upper policy and a loss function based on the sequence, the upper policy indicative of a robot movement and the loss function indicative of a degree to which a movement target is met. In addition, the method includes determining if the loss function satisfies a threshold and actuating the robot to perform the robot movement of the upper policy when the loss function satisfies the threshold.

Example 26 includes the method of Example 25, further including calculating the upper policy using a diagonal weighting of the sequence.

Example 27 includes the method of Examples 25 or 26, further including calculating the loss function further based on the upper policy.

Example 28 includes the method of Examples 25-27, wherein the sequence is a first sequence, the upper policy is a first upper policy, the robot movement is a first robot movement, and the loss function is a first loss function, the method further including changing the first sequence to a second sequence when the first loss function does not satisfy the threshold.

Example 29 includes the method of Example 28, and further includes calculating a second upper policy and a second loss function based on the second sequence, the second upper policy indicative of a second robot movement and the second loss function indicative of the degree to which the movement target is met. The example method also includes determining if the second loss function satisfies the threshold and actuating the robot to perform the second robot movement of the second upper policy when the second loss function satisfies the threshold.

Example 30 includes the method of Examples 25-29, wherein the sequence is based on long short-term memory parameters.

Example 31 includes the method of Examples 25-30, further including determining the upper policy further based on a matrix distance.

Example 32 includes the method of Examples 25-31, wherein the robot movement is first performed by the robot after the generating of the sequence.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A memory comprising machine readable instructions to cause at least one processor circuit to:
 train a reward function with reinforcement learning, the reward function to define a robot's activities in an environment;
 deploy the reward function in the robot to cause the robot to move in the environment in accordance with the reward function;
 access reward feedback based on the robot movement; and
 process the reward feedback to update the reward function.

2. The memory of claim 1, wherein the reinforcement learning is episode based.

3. The memory of claim 1, wherein the instructions cause one or more of the at least one processor circuit to cause storage of data related to the reward feedback in a database.

4. The memory of claim 1, wherein the instructions cause one or more of the at least one processor circuit to train the reward function based on a demonstration.

5. The memory of claim 4, wherein the instructions to cause one or more of the at least one processor circuit to effect the demonstration.

6. The memory of claim 1, wherein the instructions cause one or more of the at least one processor circuit to train the reward function using a tanh activation.

7. The memory of claim 1, wherein the instructions cause one or more of the at least one processor circuit to train the reward function in a simulation and in the environment.

8. A system comprising:
 interface circuitry;
 machine readable instructions; and
 at least one programmable circuit to operate in accordance with the instructions to:
  train a reward function with reinforcement learning, the reward function to define a robot's activities in an environment;
  deploy the reward function in the robot to cause the robot to move in the environment in accordance with the reward function;
  access reward feedback based on the robot movement; and
  process the reward feedback to update the reward function.

9. The system of claim 8, wherein the reinforcement learning is episode based.

10. The system of claim 8, further including a database, one or more of the at least one programmable circuit to cause storage of data related to the reward feedback in the database.

11. The system of claim 8, wherein one or more of the at least one programmable circuit is to train the reward function based on a demonstration.

12. The system of claim 11, wherein one or more of the at least one programmable circuit is to cause performance of the demonstration.

13. The system of claim 8, wherein one or more of the at least one programmable circuit is to train the reward function using a tanh activation.

14. The system of claim 8, wherein one or more of the at least one programmable circuit is to train the reward function in a simulation and in the environment.

15. A method for training a robot, the method comprising:
 training a reward function with reinforcement learning by executing an instruction with at least one processor circuit, the reward function to define a robot's activities in an environment;
 deploying the reward function in the robot to cause the robot to move in the environment based on the reward function;
 accessing reward feedback based on the robot movement; and
 updating the reward function based on the reward feedback by executing an instruction with one or more of the at least one processor circuit.

16. The method of claim 15, wherein the reinforcement learning is episode based.

17. The method of claim 15, further including:
 presenting a demonstration; and
 training the reward function based on the demonstration.

18. The method of claim 15, further including training the reward function using a tanh activation.

19. The method of claim 15, further including training the reward function jointly in a simulation and in the environment.

* * * * *